(12) United States Patent
Hernandez

(10) Patent No.: US 6,401,341 B1
(45) Date of Patent: Jun. 11, 2002

(54) KNIFE SET FOR REMOVING THORNS FROM CACTUS

(76) Inventor: Eugene Hernandez, 3420 E. Chia Rd., Palm Springs, CA (US) 92263

(*) Notice: Subject to any disclaimer, the term of this patent is extended or adjusted under 35 U.S.C. 154(b) by 0 days.

(21) Appl. No.: 09/583,435

(22) Filed: May 31, 2000

Related U.S. Application Data

(60) Provisional application No. 60/184,953, filed on Feb. 25, 2000.

(51) Int. Cl.$^7$ .............................. B26B 11/00; B26B 9/02
(52) U.S. Cl. .............................. 30/136; 30/142; 30/318; 30/353; 30/356
(58) Field of Search .......................... 30/123, 136, 309, 30/353, 356, 310, 318; 47/1.01

(56) References Cited

U.S. PATENT DOCUMENTS

| | | | | |
|---|---|---|---|---|
| 1,185,581 A | * | 5/1916 | Beymer | 30/318 |
| 1,452,930 A | * | 4/1923 | Polk | 30/356 |
| 1,698,111 A | * | 1/1929 | Terrell | 30/353 |
| 2,513,663 A | * | 7/1950 | McDaniel | 30/318 |
| 5,062,210 A | | 11/1991 | Arroyo, Jr. | 30/317 |
| 5,196,036 A | | 3/1993 | Lamas | 47/1.01 |

* cited by examiner

Primary Examiner—Hwei-Siu Payer
(74) Attorney, Agent, or Firm—Knobbe, Martens, Olson & Bear, LLP.

(57) ABSTRACT

A knife set for removing thorns from the surface of the nopal cactus petal which, in one aspect, is comprised of a cutting tool with a handle and a curved cutting blade extending out of a handle member. The handle is configured in a plane that is elevated above the average longitudinal axis of the curved blade allowing for the thorn removal without exposing the user's thumb and fingers to being cut and injured on the cactus petal prickers. The curved cutting blade has sharpened edges that extend the length of the blade and terminate in rounded corners at the blade end to prevent the cutting end from gouging and tearing the surrounding edible petal tissue. Another aspect of the disclosure comprises a securing tool having a curved blade that is generally perpendicular to the direction of the handle. The securing knife is used in combination with the cutting knife and is positioned against the cactus petal surface, near the base, to prevent the petal from shifting in location during the dethorning process. A third aspect of the disclosure relates to a method of dethorning the cactus petal using the cutting knife and the securing knife in combination.

5 Claims, 6 Drawing Sheets

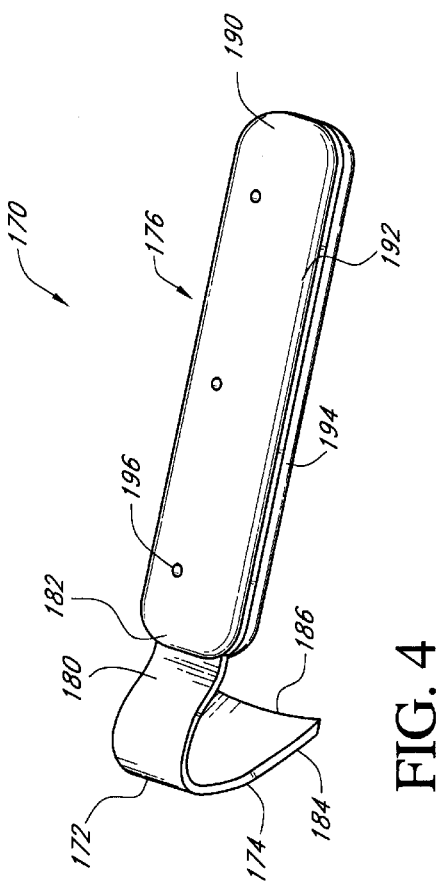
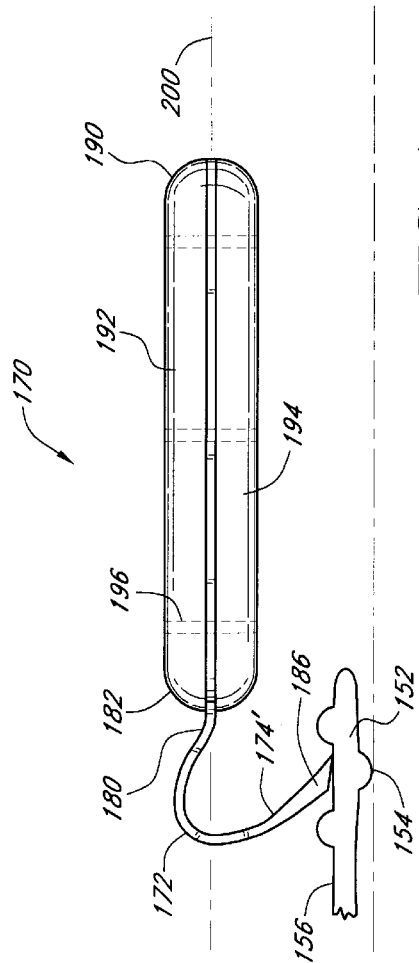

KNIFE SET FOR REMOVING THORNS FROM CACTUS

RELATED APPLICATIONS

This application claims the benefit of U.S. Provisional Application No. 60/184,953, filed on Feb. 25, 2000 which is hereby incorporated by reference in its entirety.

BACKGROUND OF THE INVENTION

1. Field of the Invention

The present invention relates to an apparatus that will remove thorn members from the surface of cactus leaves and, in particular, concerns two separate hand-held implements used in combination to secure and dethorn the cactus leaf.

2. Description of the Related Art

The nopal cactus leaf is well known in Mexico and the southwestern United States as a food staple and, in some circles, a delicacy. The fleshy leaves of the nopal cactus are large, circular, paddle-like members that can grow to be 7 inches in length, 4 inches in width and 0.5 inches thick. Generously distributed across the surface area of the cactus petal are a plurality of sharp thorny protrusions that may extend well over 1 inch in length. The razor sharp, prickly tips of the thorns create a protective barrier against animals that would otherwise feed on the fleshy nopal petal.

The nopal petal provides a healthy food source rich in vitamins A and C and is served up in a wide range of food dishes. The petal is commonly boiled in water, drained then diced into small wedges and mixed with onions, potatoes, and eggs. There are numerous other ways of serving this dish.

To prepare the nopal petal for consumption requires first removing the thorns that grow in clusters or clumps from small mounds along the surface area and edges of the cactus leaf. To peel away the thorns from the petal typically requires the use of both hands. One hand is used to secure and position the cactus petal while the other hand manipulates a knife blade to preferably slice along at the bottom of the thorn mound. The user grasps the knife handle in his or her hand and moves the knife with the blade slicing into the thorn mound such that the blade is generally travelling in a forward motion parallel to the plane of the cactus petal. It is common for the cactus petal to have a non-uniform flat surface with raised edges. Hence, slicing thorn mounds in this fashion with a straight blade knife may result in the knife tip gouging and tearing the edible portion of the raised edge of the nopal cactus tissue. Hence, using a knife often results in waste of the edible cactus tissue.

Moreover, to achieve the most effective slicing position of the knife blade against the thorn mound resulting in the least amount of petal waste, the knife hand is positioned directly over and against the petal surface. In particular, the slicing motion maintains the blade edge initially at the base of the thorn mound and continues with the blade cutting at a plane generally parallel to the petal surface through the mound. This approach is problematic because sections of the hand, including the thumb edge, the knuckles and the palm, scrape along the thorny cactus surface, resulting in cuts and abrasions. As a consequence, people often end up using the tip of the knife blade to remove the thorns which is less effective.

Furthermore, since the knife blade is straight, the cactus petal must be continually handled by the user so that the petal can be rotated and maneuvered to achieve the optimal positioning of the knife blade on the thorn mound base. The handling of the cactus petal results in injuries to the person and also makes the dethorning of the cactus less efficient.

To address this need, various cactus dethorning devices have been developed. In particular, U.S. Pat. No. 5,062,210 to Arroyo discloses an inverted V-shaped apparatus with a conventional razor blade adapted to fit within the open end of the V-shaped support handle. The elongated thin cylindrical side support members forming the V-shaped support handle extend approximately 6 inches outward and at an angle from each end of the wafer thin razor blade, to connect non-rigidly at the apex of the V. The attached blade is secured in a manner that is generally perpendicular to the side support members such that the blade edges are positioned to be used in the same plane as the cactus petal surface. To manipulate the apparatus, the user must grasp the angled side supports in the palm of the hand and scrape or peel away the thorns by positioning one edge of the blade adjacent to the thorn mound, applying a generally circular or swirling slicing motion of the blade into the thorn mound and then pulling upward and away from the cactus petal.

The non-rigid connection at the apex of the V-shaped blade handle allows the side members to be flexibly squeezed inward to cause the razor blade to bow outward in a concave manner. The concave blade edge can be preferably fixed to a desired shape by manipulating a transverse tie member to lock the handle support members at a specific distance apart from each other. A concavity to the cutting blade produces a better approach toward slicing away at the thorn mound by having the two extreme ends of the blade angled away so as not to gouge or scar the surrounding petal surface.

While the 6 inch, V-shaped handle disclosed in the Arroyo patent allows for the user to peel away the thorn mounds without putting the hand at risk of cuts and abrasions, the thin blade may fracture or detach from the flimsy support members due to the resistance provided by the thorn clumps. In addition, the blade side supports being perpendicular to the blade provide the user with an awkward and uncomfortable angle with which to slice and peel away the nopal thorn mounds, resulting in a generally awkward method of dethorning.

In particular, it is difficult to use the Arroyo device because the side members supporting the blade do not provide a substantial, comfortable surface area for the fingers and thumb to curl around and grasp. The hand, being distanced from and positioned directly over the cutting blade, makes blade manipulation more difficult because the user is unable to apply the necessary force and torque to the surface of the blade edge with the same degree of control that could otherwise be delivered by a typical knife. Slicing into the base of the thorn mound with the Arroyo device dictates the hand move pivotably about the wrist joint in up and down motions forming various angles between the forearm and the hand. A possible alternative to this motion would be to keep the wrist joint stiff and manipulate the cutting tool with the hand and forearm acting as one solid member. Either movement requires positioning the hand directly over the blade which does not capitalize on the otherwise stronger force and torque a cutting edge could deliver when the blade edge and hand act as a single member in generally the same relative plane of motion. In addition, this hand position relative to the cutting blade results in petal dethorning in a less precise manner due to the limited force and control applied to the cutting blade.

Another cactus dethorning apparatus is disclosed in U.S. Pat. No. 5,196,036 to Lamas. Lamas illustrates a hand-held inverted U-shaped device with the attachment of a razor blade member positioned between the open ends of the U-shaped handle. As with the Arroyo device, the blade is attached perpendicular to the side supports of the handle and used generally flush against the surface of the cactus petal. The same awkward and unnatural hand motions apply to the Lamas dethorning tool that were cited in reference to the Arroyo disclosure.

Further, both the Arroyo and the Lamas disclosures do not solve the more general problem associated with dethorning a nopal cactus petal which is the lack of a suitable method for securing the cactus petal in a rigid position against a flat surface allowing the removal of the thorn clusters. In particular, it is necessary to manipulate and secure the thorny cactus petal with one hand while using the other hand to slice and dethorn the petal surfaces and edges, resulting in painful cuts, abrasions and embedded thorns to the thumb, finger tips and palm area of the securing hand.

From the foregoing, it will be appreciated that there is a continuing need for a device for removing thorns from the nopal cactus petal, that is as natural and comfortable to use as a knife, and provides a design that maintains the user's fingers at a safe distance from the nopal's sharp thorns. In addition a tool is needed where the cutting blade and handle is a structurally solid member and the blade is not prone to detachment or breakage.

Furthermore, there is also a need for an improved manner of securing the cactus petal in position against a flat surface so that dethorning can be performed on the nopal petal without exposing the securing hand to cuts and abrasions and which will prevent the cactus petal from shifting around on the worktable to allow more precise and efficient dethorning with less waste or mutilation of edible cactus tissue.

SUMMARY OF THE INVENTION

The aforementioned needs are satisfied by the dethorning tool set of the present invention. In one aspect, the dethorning tool set includes a cutting knife that has a handle and a curved blade extending out of a first end of the handle. The curved blade has at least one cutting edge defined along at least one of the edges of the blade. Since the blade extends outward from a first end of the handle, the blade can be moved in a direction parallel to the plane of the petal with the user's hand located generally above and to the side of the petal. As the user's cutting hand is moving side to side, the user can exert greater downward force on the thorn mounds via the knife blade to remove the thorn mounds. The downward force also flattens out the uneven nopal areas for easier and faster thorn removal.

The curved blade, in one aspect is curved so that the concavity of the blade is located above the cutting edge when the user is holding the cutting knife. In one aspect, the handle is located above a line extending from the upper edges of the concavity such that the user's hand is located above the plane of the cactus while the user is manipulating the cutting knife to dethorn the cactus. In this way, the user's cutting hand is removed from the plane of the cactus thereby reducing the likelihood that the user's hand will be injured during the dethorning process.

In another aspect, since the cutting blade is curved, a cutting location along the at least one cutting edge of the knife can be defined by the user manipulating the handle in a direction that is generally perpendicular to the plane of the handle. Hence, the user can cut thorn mounds located at different positions across the petal with less movement and less handling of the petal. This improves the efficiency of removing the thorns and also reduces the handling of the petal which reduces the risk of injury to the user.

In another aspect of the invention, each of the edges of the blade are cutting edges which permits the knife to be used to cut thorns off of the cactus in both a forward and backwards direction. Moreover, in one embodiment, the distal end of the knife blade is rounded and not pointed which reduces the likelihood of the knife end inadvertently gouging the cactus petal during removal of thorn mounds. The distal end of the knife blade can also define a cutting surface that can be used to trim the outer perimeter of the cactus petal or gouge out hard to remove thorns.

In another aspect of the invention, the tool set includes a securing knife having a handle with a blade extending outward therefrom. The blade defines a cutting surface that is normal to the direction of the handle such that the blade can be inserted into a portion of the petal thereby permitting the user to secure the petal against a surface with the securing knife during manipulation of the cutting blade. Hence, the user can secure or rotate the petal without using his or her hands thereby reducing the risk of injury from the thorns of the cactus.

The tool set of the present invention thereby allows for removal of thorns from cactus petals in a more efficient manner. Moreover, the cutting knife and the securing knife are both configured so as to reduce the risk of injury to the user as a result of inadvertent contact with the thorns of the cactus. These and other objects and advantages will become more fully apparent from the following description taken in conjunction with the accompanying drawings.

BRIEF DESCRIPTION OF THE DRAWINGS

FIG. 4 is a perspective view of the cactus petal securing knife of the preferred embodiment;

FIG. 5 is a side view of the cactus petal securing knife of the preferred embodiment;

DETAILED DESCRIPTION OF THE PREFERRED EMBODIMENT

Figure 1:
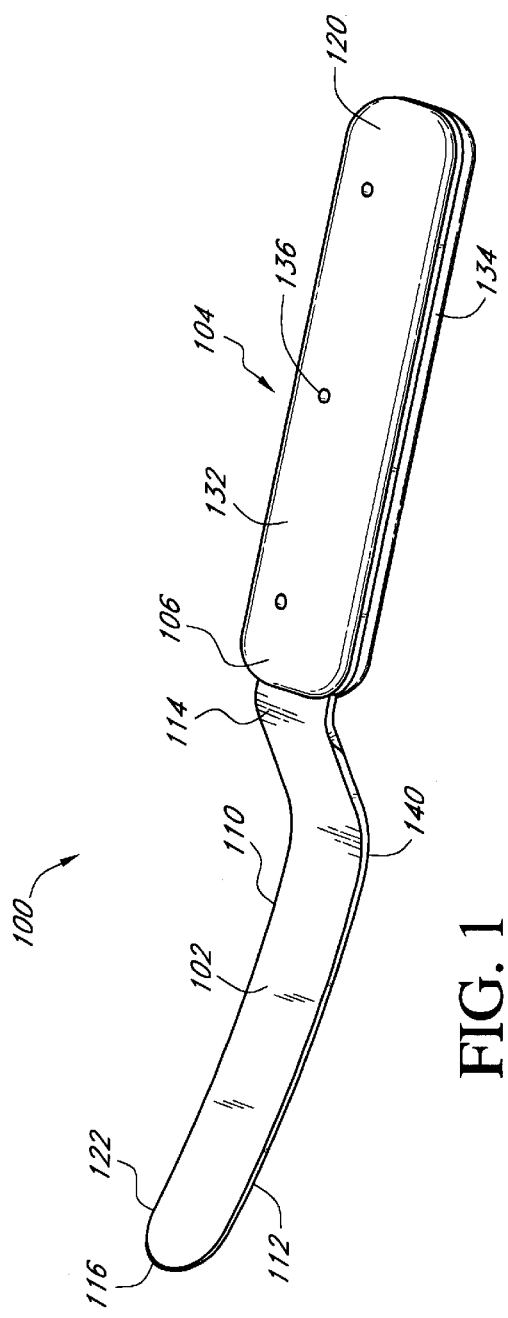
FIG. 1 is a perspective view of a cactus petal cutting knife of the preferred embodiment.

Reference will now be made to the drawings wherein like numerals refer to like parts throughout. FIG. 1 illustrates one embodiment of a cactus petal cutting knife 100. As illustrated on this embodiment, the cutting knife 100 is comprised of a generally curved cutting blade 102 extending out of a first end 106 of a handle assembly 104. The cutting knife 100 is used to remove the nopal cactus thorns which will be illustrated in FIGS. 6 and 7. The cutting blade 102 in this particular embodiment, is constructed from steel with a length of 4.25 inches, a width of 1.0 inch and a thickness of approximately 0.0625 inch. The cutting blade 102 has a first edge 110 and a second edge 112 that are in the same plane and extend along the full length of the cutting blade 102. The first edge 110 and the second edge 112 begin at a first end 114 of the cutting blade 102 and terminate at a second end 116 of the curved blade 102, wherein the second end 116 has generally rounded sharp corners 122. The first edge 110, the second edge 112 and the second end 116 of the cutting knife 100 are frequently sharpened to facilitate the dethorning process which will be described in greater detail below. The cutting blade 102 is generally concave in shape and will be described in greater detail in reference to FIG. 2.

Figure 2:
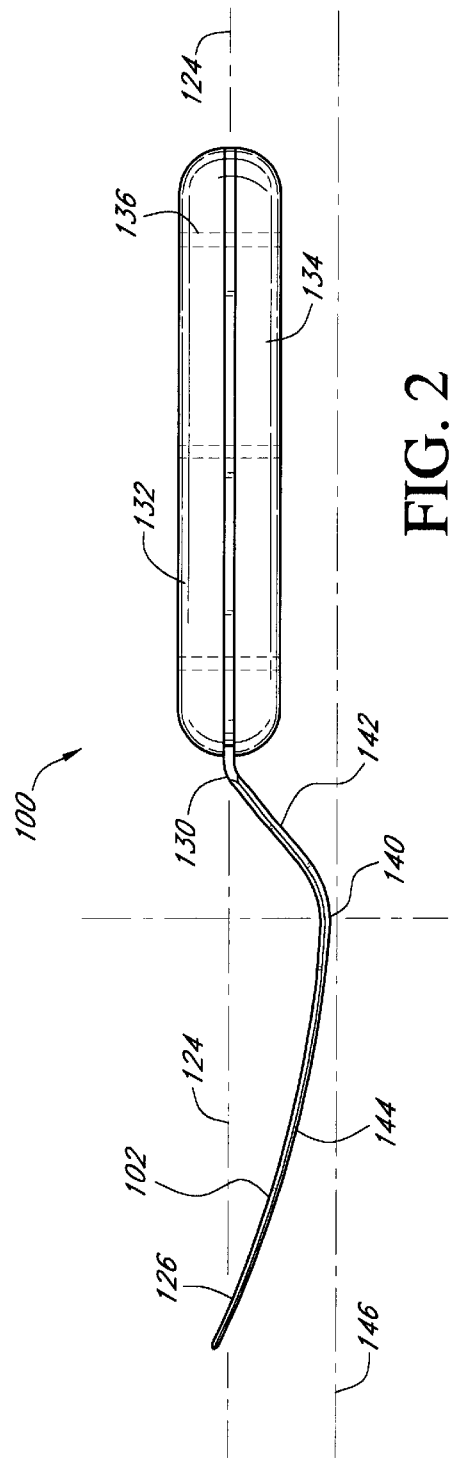
FIG. 2 is a side view of the cactus petal cutting knife of the preferred embodiment.

The first end 114 of the cutting blade 102 is attached to the first end 106 of the handle 104 of the cutting knife 100. The handle 104 has the first end 106 and a second end 120 such that the first end 106 is attached to the first end 114 of the cutting blade 102 and extends outward therefrom in an axis that is an extension of an imaginary axis 124 (shown in FIG. 2). As illustrated in FIG. 2, a first imaginary axis 124 is drawn between a first point 126 located at the extreme second end 116 of the cutting blade 102 and a second point 130 located on the extreme first end 114 of the cutting blade 102. In particular, the handle 104 is comprised of an elongate first side 132 and an elongate second side 134, fixedly positioned against each other with a plurality of rivets 136, which is further illustrated in FIG. 2. The combination of the first side 132 and the second side 134 of the handle 104 assembly form a single member handle 104 that is 4.5 inches in length, 1.125 inches in width, and approximately 1.0 inch in thickness. It will be appreciated that the cutting knife handle 104 provides a substantial surface area and a comfortable grip for allowing the user to dethorn cactus petals for long periods of time.

Figure 3:
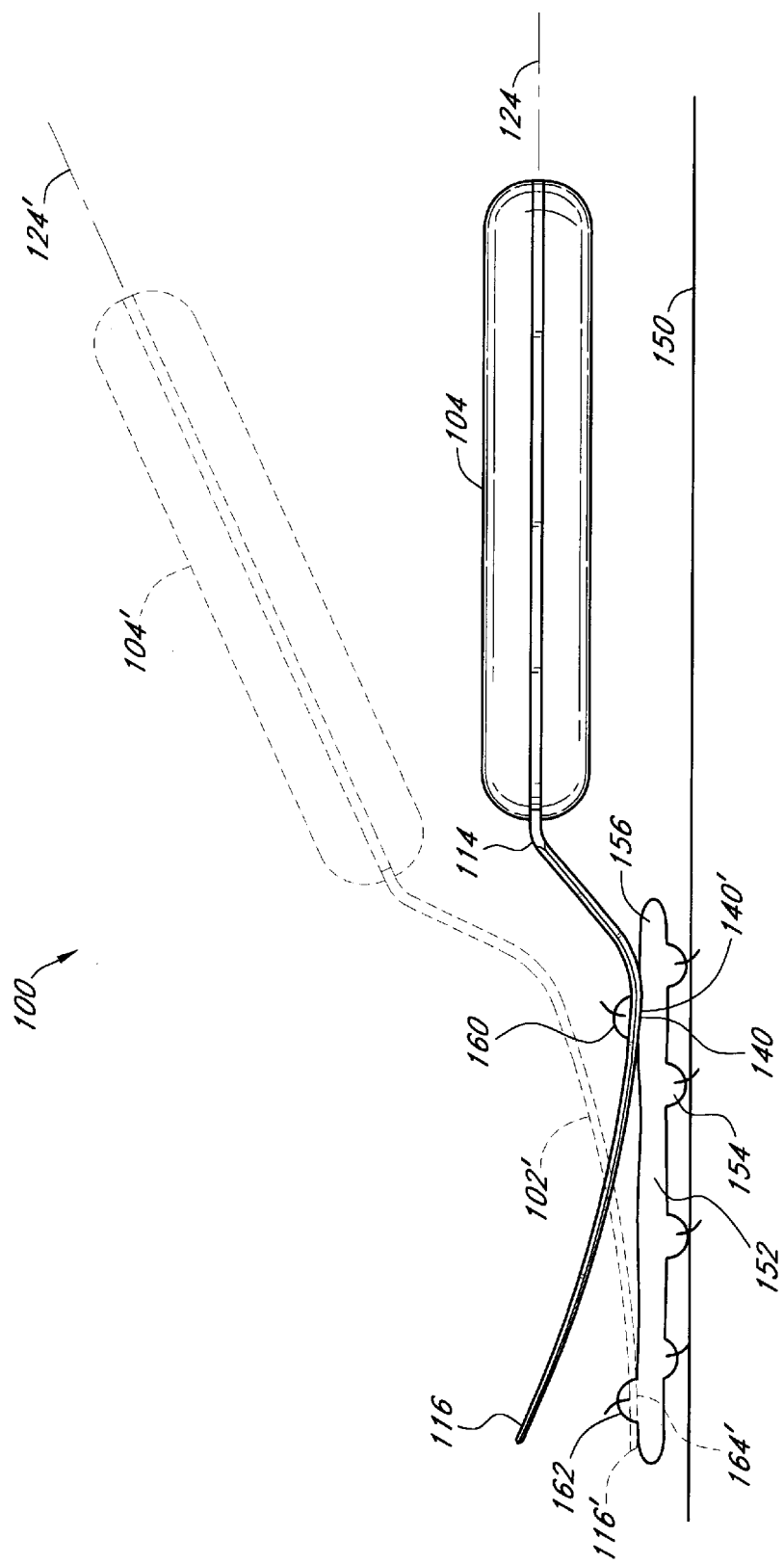
FIG. 3 is a side view of the cutting knife illustrating the minimum and maximum dethorning angle that the handle forms relative to the cactus petal surface.

Now referring to FIG. 2, the side view of the cutting knife 100 can be seen and, in particular, the substantial downward curve or concavity of the cutting blade 102 in relation to the straight axis of the attached handle 104 assembly. In particular, a transitional point of concavity 140 of the cutting blade 102 occurs at a point where the slope of the blade shape transcends from negative to positive. Specifically, a first member 142 of the blade 102 extends downward from the first end 106 of the handle 104 to the transitional point of concavity 140, whereas a second member 144 extends in a gradual positive sloping manner to the second end 116 of the cutting blade 102. In addition, FIG. 2 also illustrates a typical angle of dethorning a cactus petal such that the imaginary axis 124 is parallel and elevated above a first tangential axis 146 to the transitional point of concavity 140 (which is also a first point of contact 140' in FIG. 3) of the petal surface 156. In this way, the user's hand is positioned on the cutting blade handle 104 and elevated above and generally adjacent to the cactus petal, reducing the possibility of the hand receiving painful cuts and abrasions from the thorn mounds. The possible elevations that dethorning can be performed with the cutting knife 100 will be described in greater detail as illustrated in FIG. 3. FIG. 2 further illustrates the manner in which the first side 132 and the second side 134 of the handle 104 combine to form a rigid, one piece member ergonomically designed to comfortably accommodate the palm of a cactus cutter's hand for extended periods of cutting.

FIG. 3 illustrates a side view of the cutting knife 100 and a cactus petal 152 with a plurality of thorn mounds 154. In particular, the first edge 110 of the cutting blade 102 is shown in solid lines with the transitional point of concavity 140 of the cutting blade 102 in contact with the base of a first thorn mound 160 in a manner that allows the cutting handle 104 to be positioned above and adjacent the petal surface 156, keeping the fingers and thumb from being pricked by the sharp thorns. A substantial length of the first edge 110 of the cutting blade 102 may be used to slice through the thorn mounds and a point of contact with the petal surface will vary laterally along the same plane as the petal surface 156. Specifically, the point of contact along the cutting blade is a function of handle elevation.

As an example, with the cutting knife handle 104 positioned at the first imaginary axis 124, which is also parallel to a plane of the worktable surface 150, the transitional point of concavity 140 will also be defined as a first point of contact 140' of the first edge 110 of the cutting blade 102. Further, with the handle 104' elevated to a second imaginary axis 124', the point of contact of the first edge 110 of the cutting blade 102' has rotatably shifted along the first edge of the cutting blade 102 toward the direction of the second end of the cutting blade 116', defined as a second point of contact 164'. In this example, the second point of contact 164' selectively occurs at the base of a second thorn mound 162 of the cactus petal 152. The second thorn mound 162 is then laterally sliced away by using techniques which will be described in FIGS. 6 and 7. In this way, any thorn mound may be transversely selected for removal by elevating the cutting knife handle 104 in a rotatably upward or downward direction, so that the point of contact of the first edge 110 of the cutting blade 102 will shift in a forward or a reverse direction along the plane of the cactus petal surface 156.

FIG. 4 illustrates a perspective view of one embodiment of a cactus dethorning securing knife 170, and is comprised of a curved securing blade 172 which defines a surface 174 that is normal to the direction of a handle 176. A first end 180 of the curved securing blade 172 extends outward from a first end 182 of a securing knife handle 176 for approximately 1 inch and curves downward in a curved manner for approximately 1.25 inches in length. The concave profile of the curved securing blade 172 can be better seen in the side view of FIG. 5.

The surface 174 of the curved securing blade 172 in this particular embodiment is approximately 1.75 inches in width at the widest portion of a second end 184 of the securing blade 172. The second end 184 of the curved securing blade 172 has a first cutting edge 186 that is slightly curved with a backward slant and provides an edge for rigidly positioning the securing knife 170 against the base of the cactus petal. In this manner, the petal will not be allowed to move during the dethorning process, which will be described in detail as referenced in FIGS. 6, 7 and 8.

The first end 180 of the curved securing blade 172 is attached to the first end 182 of the securing knife handle 176. The handle 176 has a first end 182 and a second end 190 such that the second end 190 extends outward therefrom in an axis that is an extension of the first end 180 of the curved securing blade 172. In particular, the handle 176, in this embodiment, is comprised of an elongate first side 192 and an elongate second side 194 fixedly positioned against each other with a plurality of rivets 196, which is further illustrated in FIG. 5. The combination of the first side 192 and the second side 194 of the handle assembly form a single member cutting knife handle 176 that is 4.5 inches in length, 1.0 inches in width, and approximately 0.75 inch in thickness. It will be appreciated that the cutting knife handle 176 provides a substantial grip length for the user's hand to grasp while securing the cactus petal for extended periods of time.

Figure 6:
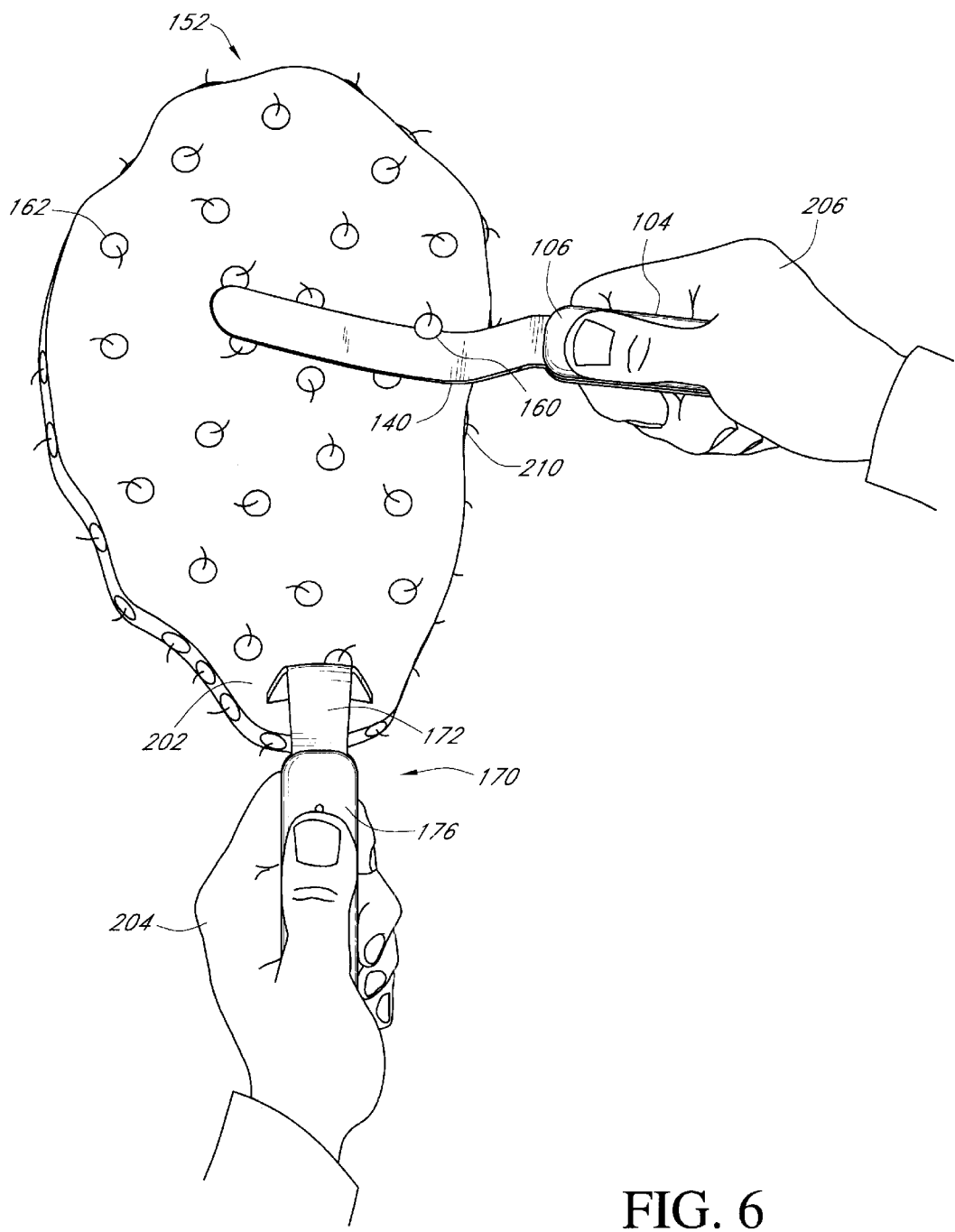
FIG. 6 is a perspective view illustrating the manner in which a cactus petal is dethorned using the cutting knife and the securing knife in combination.
Figure 7:
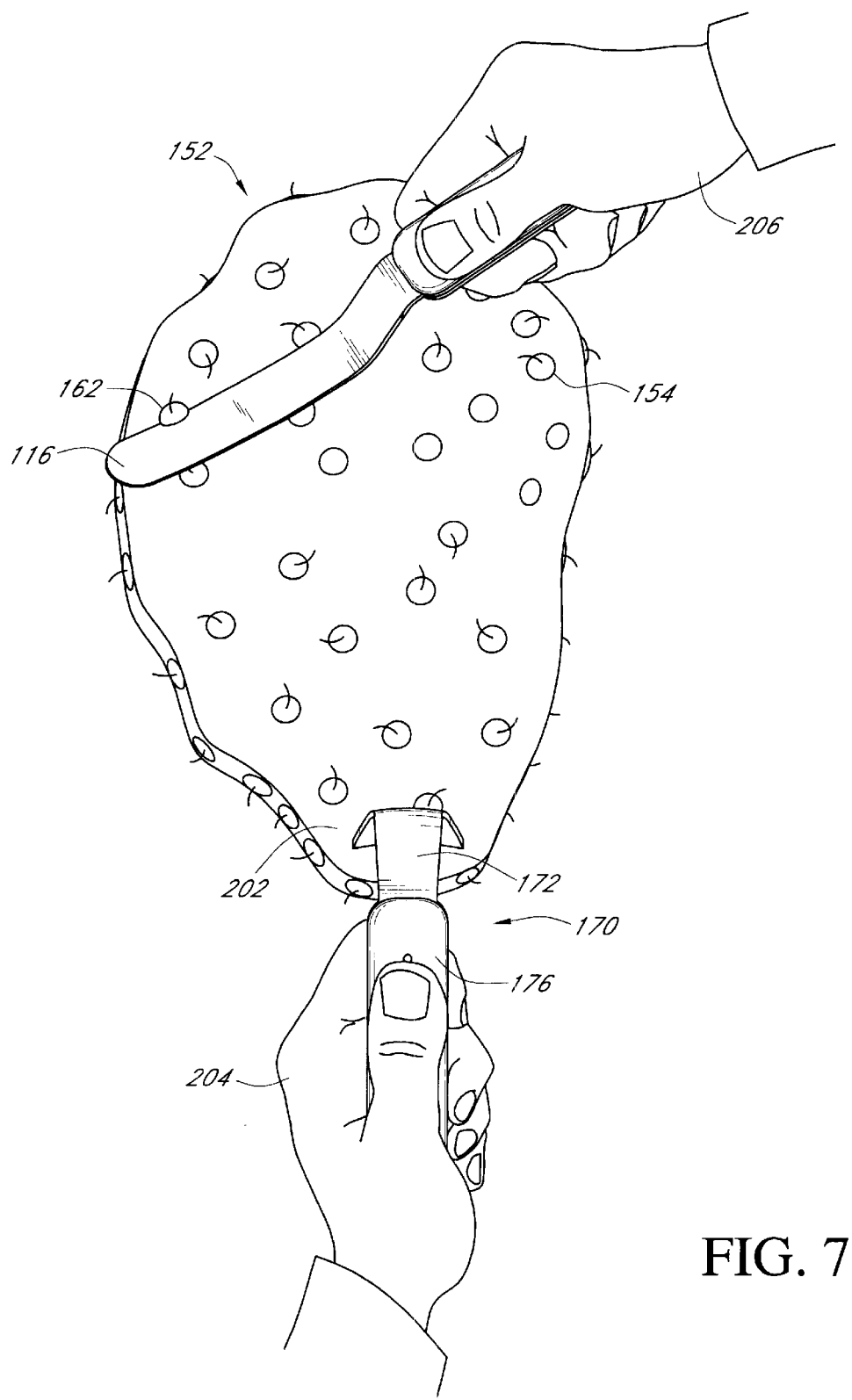
FIG. 7 is a perspective view illustrating the manner in which the cutting knife is angled upward along the axis of curvature of the cutting blade to dethorn the cactus petal in combination with the securing knife.

As can be seen in the side view of FIG. 5 of the securing knife 170, the first end 182 and the second end 190 of the handle 176 form a plane that is generally perpendicular to the cutting surface 174' of the curved securing blade 172. The first cutting edge 186, of the curved securing blade 172, when positioned flush against the surface 156 of the cactus petal 152, will allow the handle 176, with longitudinal axis 200 to be used above the surface 156 of the prickly cactus petal 152. In particular, the handle 176 elevation provides ample clearance for the fingers of the securing hand 204 not to be cut or scratched by the thorn mounds, which is illustrated in FIGS. 6 and 7. Further, attached to the first end 180 of the curved securing blade 172 is the first side 192 and the second side 194 of the handle 176 assembly which is fastened together with a plurality of rivets 196.

Referring now to FIGS. 6 and 7, a method in which a cactus petal 152 is dethorned using the cutting knife 100 and the securing knife 170 in combination is illustrated. First, the cactus petal 152 is placed on a flat worktable surface (not shown in this view), so that the base 202 of the cactus petal 152 is positioned in a direction toward the securing hand 204 of the dethorner. The curved securing knife blade 172 can be seen in a top view, pressed against the petal surface 156 at the petal's base 202. The user's hand 204 is shown with the thumb aligned along the longitudinal axis of the handle 176 with the fingers wrapped substantially around the handle 176. In this way, the thumb will provide a downward force against the handle 176 assembly which is transmitted to the curved securing blade 172, resulting in the petal surface 156 being fixedly positioned against the worktable surface for proper dethorning. Secondly, the user's cutting hand 206 is shown grasping the cutting knife 100 with the thumb positioned slightly below the first end 106 of the handle 104 with the fingers curled around the handle 104.

To begin the actual dethorning, starting at the right hand side 210 of the cactus petal 152, the first edge 110 of the cutting blade 102 is positioned at the first mound 160 located closest to the right hand side 210 of the petal 152. Further, the transitional point of concavity 140 of the cutting blade 102 rests upon the cactus petal surface 156, as was previously illustrated in the side view of FIG. 3, allowing the cutting knife hand 206 to be elevated above the thorn mounds. In particular, positioning a portion of the first edge 110 of the cutting blade 102 at the transitional point of concavity 140 results in a substantial portion of the remaining portions of the knife blade being elevated above the tissue of the cactus 156 due to the curvature of the cutting blade 102.

Thirdly, the cutting blade 102 is laterally moved adjacent the first thorn mound 160 in a direction generally parallel to the plane of the tissue of the cactus such that the cutting blade 102 slices through the first thorn mound 160 and such that the cutting knife hand 206 is removed from adjacent thorns of the cactus due to the continued elevation of the cutting knife handle 104. In combination with the motions of the cutting knife hand 206, the method includes applying a force on the handle 176 of the securing knife 170 in a direction that is generally opposite the direction of the movement of the cutting knife 100 when the mound is being removed. In this manner, the first edge 110 of the cutting blade 102 effectively removes the thorn mound while reducing damage to the surrounding cactus tissue. In particular, the second end 116 of the cutting blade 102, as illustrated in FIG. 6, is raised to avoid gouging and tearing the nopal tissue.

FIG. 7 illustrates a continuation of the method of dethorning a cactus petal by elevating the cutting knife handle 104. In particular, the cutting knife 100 is shown such that the first edge 110 of the cutting blade 102 rotatably engages the base of the thorn mound near the second end 116 of the cutting blade 102 by elevating the handle 104 upward. The plane of the cutting blade 102 remains generally parallel to the cactus petal surface 156, but the handle 104 is elevated so that a short increment of the curved first edge 110 of the cutting blade 102 selectively engages the second thorn mound 162 toward the left side of the petal. To continue with the dethorning process, as was previously described in reference to FIG. 6, the cutting blade 102 is maintained at this elevated position and moved adjacent the thorn mound in a direction generally parallel to the thorn mound so that the cutting blade 102 cuts through the second thorn mound 162 and such that the cutting knife hand 206 is substantially removed from adjacent thorns of the cactus. In combination with the motions of the cutting knife hand 206, the method includes applying a force on the handle 176 of the securing knife 170 in a direction that is generally opposite the direction of the movement of the cutting knife 100 when the mound is being removed. In this manner, the plurality of thorn mounds 154 are removed by elevating or lowering the cutting blade 102 to selectively target adjacent thorn mounds that fall within the selected width of the first edge 110 of the curved cutting blade 102 that is making contact with the petal surface 156. Hence, the remaining portions of the curved cutting blade 102 will not cut through the surrounding tissue, resulting in less waste of the edible nopal tissue.

Figure 8:
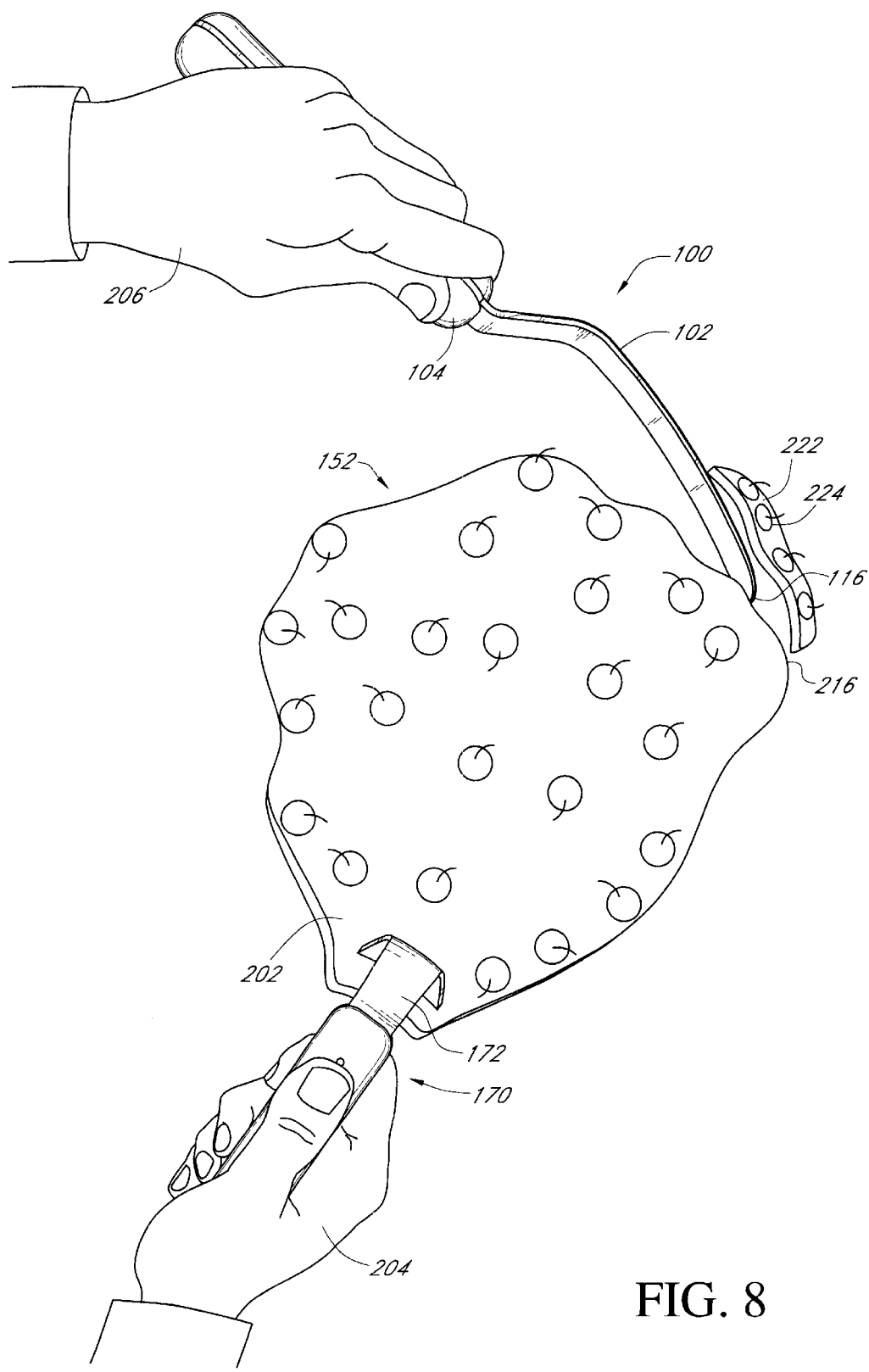
FIG. 8 is a perspective view illustrating the manner in which the edge of the cactus petal is dethorned with the cutting knife in combination with the securing knife.

It will be appreciated that the dethorning method includes a procedure for removing thorn mounds from the cactus petal edge 216 as illustrated in FIG. 8. The securing knife 170 is again used in combination with the cutting knife 100 and, to begin, the base 202 of the cactus petal 152 is preferably positioned in a direction toward the securing hand 204 of the user. The curved securing blade 172 is shown (in the user's right hand for this example) pressed against the surface of the petal at the petal's base 202. The cutting knife 100 is illustrated in the user's left hand such that the cutting knife handle 104 is rotated 180 degrees about the axis of the width of the tool and such that the cutting blade 102 protrudes generally upward and outward from the cactus petal 152. In particular, the second end 116 of the cutting blade 102 is positioned against the extreme upper corner of the cactus petal edge 216 such that the rounded sharp corner 122 of the second end 116 of the cutting blade 102 cuts through the cactus petal edge 216 until the second end 116 of the cutting blade 102 makes contact with the worktable surface.

Further, the cutting knife 100 is positioned in an elevated manner and the rounded sharp corner 122 of the second end 116 of the cutting blade 102 as the user proceeds to slice through and along the cactus petal edge 216 in a counterclockwise manner (left-handed example). As is illustrated in FIG. 8, a detached edge of cactus tissue 222 with a plurality of thorn mounds 224 is shown and serves as an example increment of tissue edge that may be removed with the counterclockwise slicing motion of the cutting knife hand 206.

To continue with the dethorning process, the securing hand 204 grasping the securing knife 170 can reposition the base of the cactus petal 202 in a generally clockwise direction upon the worktable cutting surface, allowing the cutting knife hand 206 to be comfortably repositioned on a new increment of cactus tissue edge (not shown). The slicing process is continued until all thorn mounds have been successfully removed from the entire perimeter of the cactus petal 152. The method of dethorning the perimeter of the cactus petal eliminates direct handling of the thorny cactus surface that would otherwise occur if the user was to use a straight knife or the aforementioned razor blade devices.

It will be appreciated that the use of the cutting knife 100 and the securing knife 170 in combination provides an opportunity for the dethorning person to quickly and effectively remove thorn mounds from the nopal cactus petal in a manner that will not expose the fingers and thumbs to the harsh, sharp prickers protecting the nopal cactus petal. Specifically, these advantages over prior art devices in dethorning the cactus petal are achieved due to the curvature of the cutting blade 102 in combination with the elevated handle assembly 104. Furthermore, the method outlined above provides a technique for dethorning the cactus petal in a way that reduces the possibility of damage and waste of the edible petal tissue. While the foregoing description has described the use of the cutting knife 100 in combination with the securing knife 170, it will be appreciated that the cutting knife 100 can be used by itself and still provide significant advantages in dethorning cactuses. Hence, the use of the cutting knife 100 by itself is within the scope of the present invention.

Although the foregoing description of the preferred embodiment of the present invention has shown, described and pointed out the fundamental novel features of the invention, it will be understood that various omissions, substitutions, and changes in the form of the detail of the apparatus as illustrated as well as the uses thereof, may be made by those skilled in the art without departing from the spirit of the present invention. Consequently, the scope of the present invention should not be limited to the foregoing discussions, but should be defined by the appended claims.

What is claimed is:

1. A tool set for removing thorns from a cactus, the set comprising in combination:

a holding knife having an elongate handle extending in a first direction between a first end and a second end of the handle, wherein the holding knife further comprises a knife blade attached to the second end of the holding knife so as to define a cutting surface that extends in a direction that is substantially perpendicular to the first direction such that the holding knife can be positioned in an end of a cactus petal such that a user grasping the elongate handle with the knife blade positioned in the cactus petal can resist movement of the petal in the first direction; and a cutting knife having a handle with a first end and a second end and a knife blade having a first end and a second end, wherein the first end of the knife blade of the cutting knife extends outward from the first end of the handle of the cutting knife, wherein the knife blade of the cutting knife has at least one cutting edge and is curved such that a point of contact between the knife blade of the cutting knife and the cactus can be moved along the at least one cutting edge by raising or lowering the handle of the cutting knife in a direction that is generally perpendicular to the plane of the cactus wherein the second end of the knife blade of the cutting knife is rounded so as to reduce gouging of the petal of the cactus during removal of the thorns of the cactus.

2. The tool set of claim 1, wherein the knife blade of the cutting knife defines a transitional point of concavity and the handle of the cutting knife is located a vertical distance above the transitional point of concavity so that the user's hand is removed from the plane of the cactus petal during movement of the knife blade of the cutting knife in a direction generally parallel to the plane of the cactus for removal of the thorns of the cactus.

3. The tool set of claim 1, wherein the second end of the knife blade of the cutting knife is sharpened so as to permit the second end of the knife blade to be used to remove thorns from the cactus.

4. The tool set of claim 3, wherein the at least one cutting edge of the cutting knife is comprised of a first cutting edge and a second cutting edge that extends between the first and the second ends of the knife blade.

5. The tool set of claim 1, wherein the knife blade of the holding knife is concave with respect to the elongate handle so as to facilitate retaining the petal in position when the cutting knife is being moved in a plane generally parallel to the plane of the cactus petal to remove the thorns.

* * * * *